(12) United States Patent
Gasparovic et al.

(10) Patent No.: US 11,273,707 B2
(45) Date of Patent: Mar. 15, 2022

(54) VEHICLE COMPRISING TRANSFER CASE AND METHOD FOR OPERATING SAID VEHICLE

(71) Applicant: Magna Powertrain GmbH & Co KG, Lannach (AT)

(72) Inventors: Sven Gasparovic, Graz (AT); Andreas Rudolf Hafner, Lieboch (AT); Simon Kaimer, Fernitz (AT); Daniel Lindvai-Soos, Graz (AT); Daniel Prix, Graz (AT); Gerhard Hofer, Pinggau (AT); Dominik Schober, Graz (AT); Franz Wallner, Ilz (AT); Alexander Hehenberger, Premstaetten (AT); Martin Bloder, Sinabelkirchen (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 317 days.

(21) Appl. No.: 16/500,581

(22) PCT Filed: Apr. 5, 2018

(86) PCT No.: PCT/EP2018/058803
§ 371 (c)(1),
(2) Date: Oct. 3, 2019

(87) PCT Pub. No.: WO2018/185258
PCT Pub. Date: Oct. 11, 2018

(65) Prior Publication Data
US 2020/0114757 A1 Apr. 16, 2020

(30) Foreign Application Priority Data

Apr. 6, 2017 (DE) .................. 10 2017 205 921.4
Oct. 23, 2017 (DE) .................. 10 2017 218 858.8

(51) Int. Cl.
*B60K 17/342* (2006.01)
*B60K 17/346* (2006.01)

(52) U.S. Cl.
CPC ........ *B60K 17/3467* (2013.01); *B60K 17/342* (2013.01); *B60K 17/3462* (2013.01)

(58) Field of Classification Search
None
See application file for complete search history.

(56) References Cited

U.S. PATENT DOCUMENTS

| 6,464,608 | B2 * | 10/2002 | Bowen | ................. | B60K 23/08 475/5 |
| 8,888,638 | B2 * | 11/2014 | Mueller | ................ | B60W 10/02 475/5 |
| 2002/0107101 | A1 | 8/2002 | Bowen et al. | | |

FOREIGN PATENT DOCUMENTS

DE 10146386 A1 4/2003
DE 112009004352 T5 6/2012
(Continued)

OTHER PUBLICATIONS

Written Opinion of the international Searching Authority for international Application No. PCT/EP2018/058803; dated May 30, 2018; 9 pages.

(Continued)

*Primary Examiner* — Dirk Wright
(74) *Attorney, Agent, or Firm* — Dickinson Wright PLLC

(57) ABSTRACT

A vehicle having a longitudinal engine and permanent rear axle drive is proposed, which vehicle has an internal combustion engine and an electric machine, a transfer gearbox distributing drive torques as required to two drive axles, the transfer gearbox having three shafts, a main shaft serving as a drive shaft of the rear axle, a secondary shaft serving as a drive shaft for the front axle, and an intermediate shaft (Continued)

applying a torque, a shifting unit being installed between the reduction gear-box and the power summation gearbox.

17 Claims, 15 Drawing Sheets

(56) References Cited

FOREIGN PATENT DOCUMENTS

| | | |
|---|---|---|
| DE | 112010002242 T5 | 7/2012 |
| DE | 102013009081 A1 | 12/2014 |
| DE | 102014009866 A1 | 1/2016 |
| JP | 2006117084 A | 5/2006 |

OTHER PUBLICATIONS

International Search Report (ISR) for International Application No. PCT/EP2018/058803; dated May 30, 2018; 6 pages; English Translation of the ISR is Included.

* cited by examiner

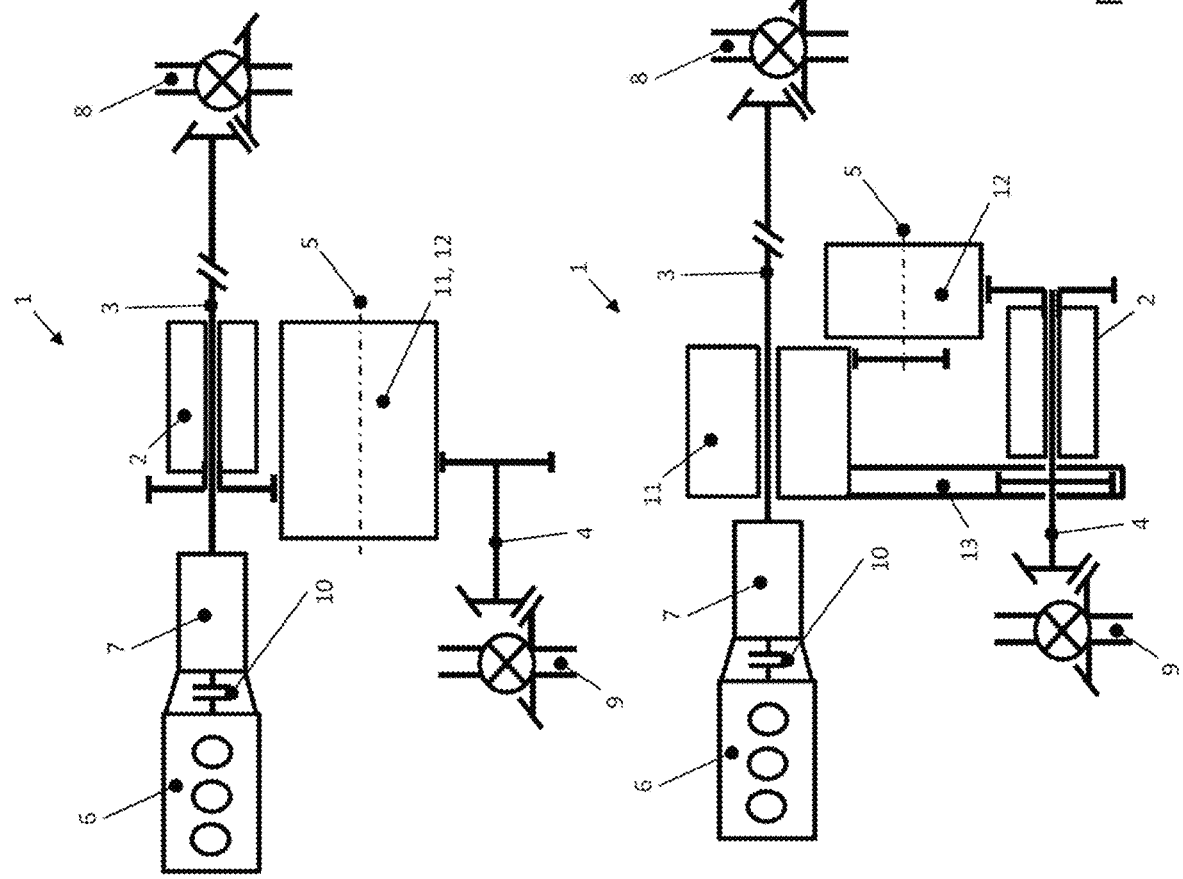

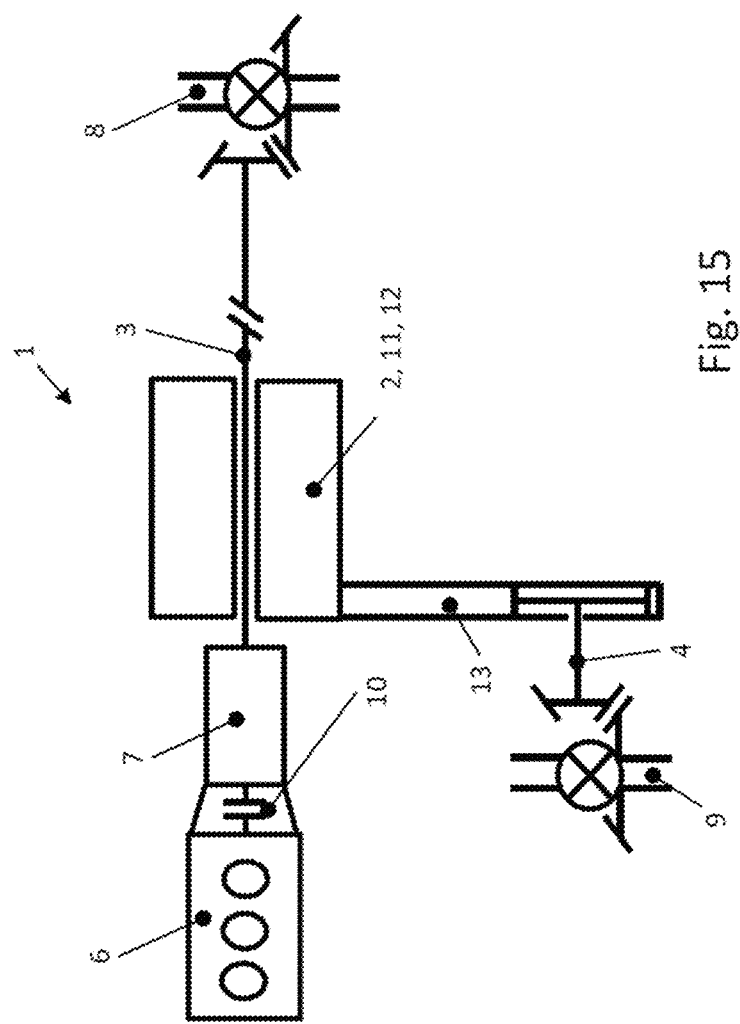

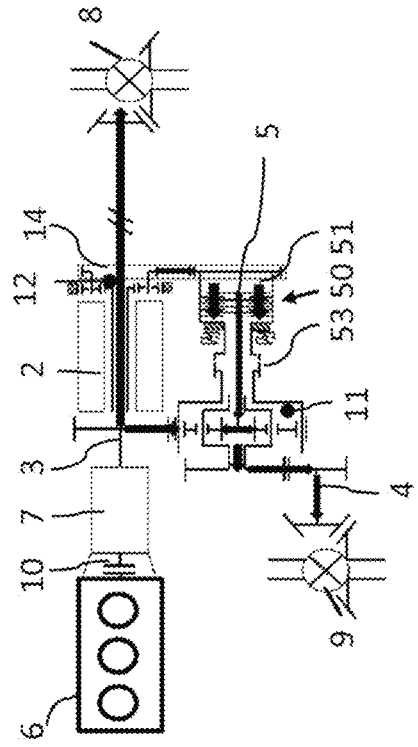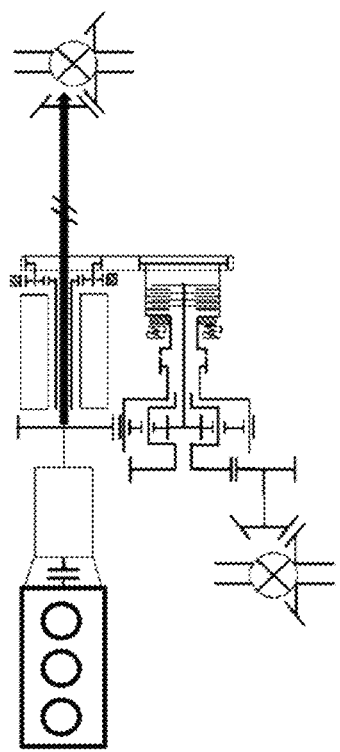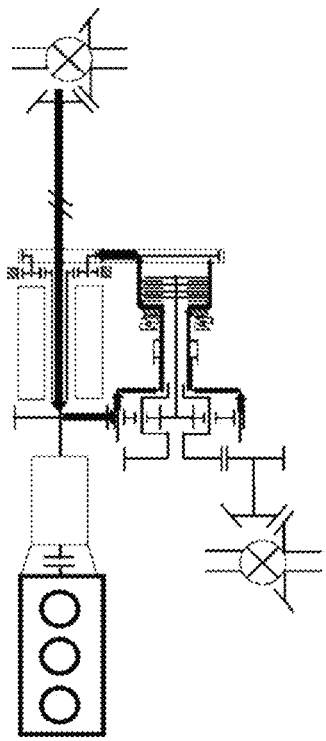

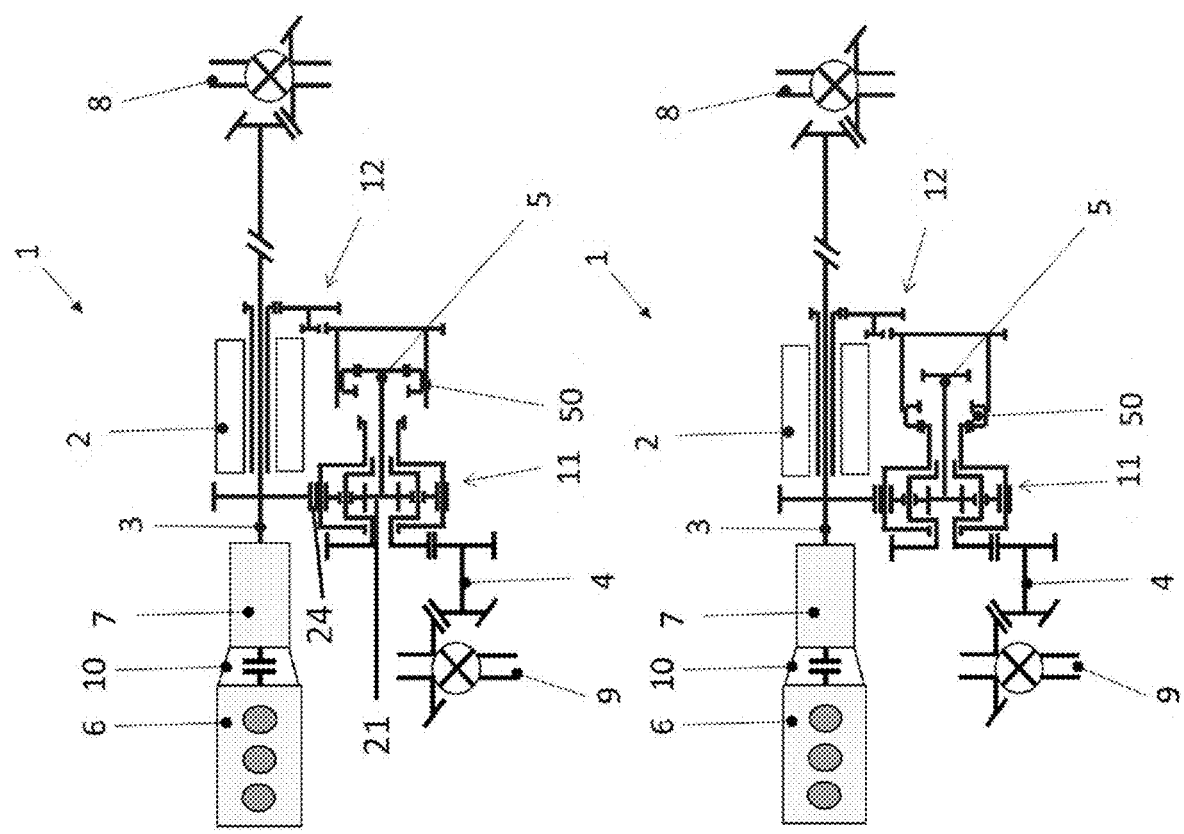

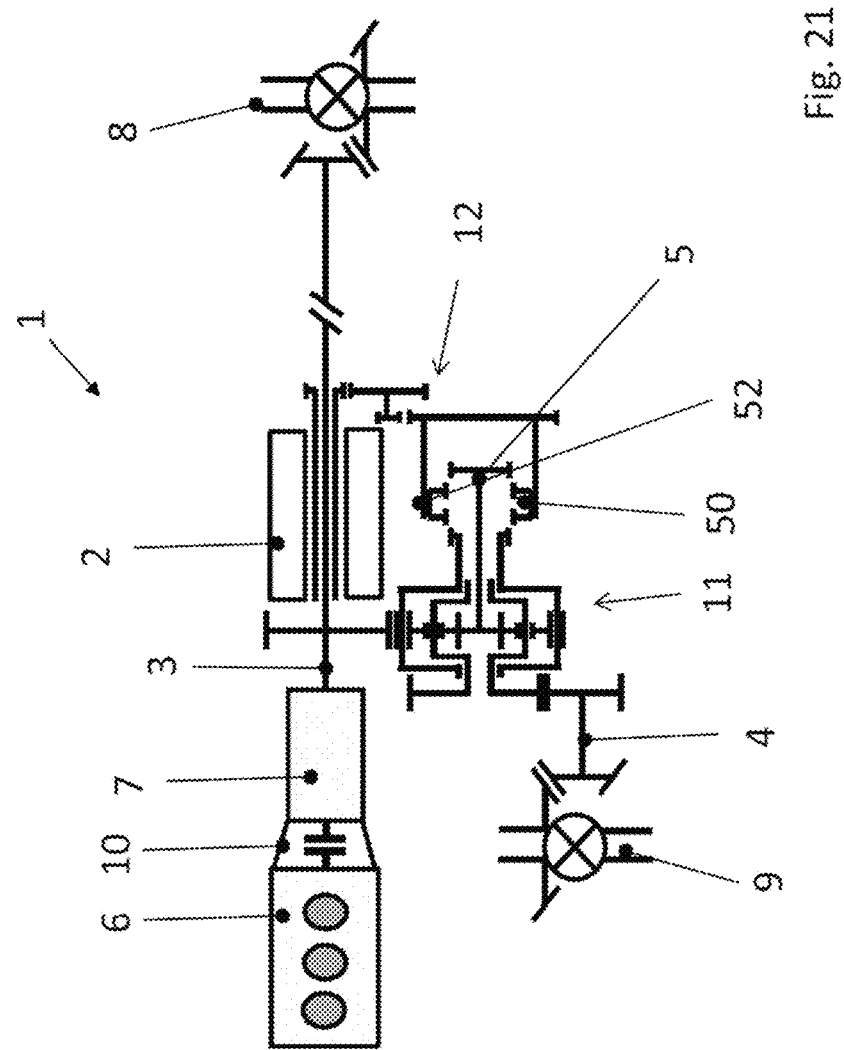

VEHICLE COMPRISING TRANSFER CASE AND METHOD FOR OPERATING SAID VEHICLE

CROSS-REFERENCE TO RELATED APPLICATIONS

This application is a National Stage of International Application No. PCT/EP2018/058803, filed Apr. 5, 2018, which claims priorities to DE102017205921.4, filed Apr. 6, 2017 and DE102017218858.8, filed Oct. 23, 2017. The entire disclosures of each of the above applications are incorporated herein by reference.

FIELD OF THE INVENTION

The invention relates to a vehicle having a longitudinally arranged engine and permanent rear axle drive, which vehicle has an internal combustion engine and an electrical machine, a transfer gearbox distributing drive torques as required to two drive shafts, the transfer gearbox having three shafts, a main shaft serving as a drive shaft for the rear axle, a secondary shaft as a drive shaft for the front axle, and an intermediate shaft applying a torque.

The invention furthermore relates to a method for operating a vehicle.

BACKGROUND OF THE INVENTION

This section provides information related to the present disclosure which is not necessarily prior art Four-wheel drive motor vehicles are constantly under development on account of increased fuel consumption and greater demands in relation to exhaust gas directives. Stricter requirements laid down by exhaust gas standards for automobiles make it necessary for efficiency-improving measures to be implemented, above all in the case of four-wheel drive vehicles.

The additional fuel consumption and resulting exhaust gas increase from four-wheel drive vehicles can be limited by switching out of four-wheel drive mode. With current solutions, e.g. friction clutch-based transfer cases, this is achieved by completely opening the friction plate clutch.

The at least partial electrification of the motor vehicle or of the motor vehicle drivetrain, in particular, is at the fore in this context—the at least partial hybridization of the motor vehicle or of the motor vehicle drive achieves a fine balance between reduced fuel consumption, adequate range and good performance.

Relinquishing four-wheel drive is not an alternative, as many vehicle manufacturers rely on four-wheel drive for their vehicle dynamics. Systems known hitherto which are based on friction plate clutch technology can by controlled in a fully variable manner and supply a torque distribution of 0% to 100% to the secondary shaft. Four-wheel drive systems which are based on friction plate clutches have the disadvantage that rotational speed differences which occur at the axles have an effect on the torque that can be displaced at the secondary shaft. By means of a friction plate clutch-based four-wheel drive system, a torque distribution can therefore be adjusted. However, with full steering lock and a simultaneously high frictional coefficient at the clutch, the torque distribution is limited, since the kinematic tire slippage between the axles at the frictional plate clutch must likewise be allowed by slippage in the frictional plate clutch.

Alternatively, central differentials are also used. These have a fixed torque distribution between the front and rear axle. One advantage of central differentials in this case is that the torque can be correctly distributed when there is kinematic slippage too.

A transfer gearbox for a hybrid four-wheel drive is known from DE 103 196 81 A1. In this case, a transfer gearbox with at least three shafts is provided which is con-figured as the summation gearbox. The drive power in this case is distributed between the primary and secondary shaft.

A generic transfer gearbox is known from DE 11 2009 004 352 T5.

It is known from DE 10 2013 009 081 A1 for an electric machine to be connected to an output shaft via a clutch device and two shifting positions.

SUMMARY OF THE INVENTION

This section provides a general summary of the disclosure, and is not a comprehensive disclosure of its full scope or all of its features The problem addressed by the invention is that of improving existing transfer gearboxes in a hybridized system in the vehicle.

The problem is solved by a vehicle having a longitudinally arranged engine and permanent rear axle drive, which vehicle has an internal combustion engine and an electric machine, a transfer gearbox distributing drive torques as required to two drive shafts, the transfer gearbox having three shafts, a main shaft serving as a drive shaft of the rear axle, a secondary shaft serving as a drive shaft for the front axle, and an intermediate shaft applying a torque, the transfer gearbox having a reduction gearbox and a power summation gearbox and the summed output power of the power summation gearbox prevailing at the secondary shaft by way of a chain or a gearwheel set, wherein a shifting unit (50) is installed between the reduction gearbox (12) and power summation gearbox (11).

The drive torque at the front and rear axle can thereby be variably adjusted, even when there are rotational speed differences, and problems with wear can be reduced.

In the vehicle according to the invention, rotational speed differences between the front and rear axles do not present a problem. The combination of the power summation gearbox and reduction gearbox with an electric machine means that great accuracy is achieved in torque distribution between the front axle and the rear axle.

It is advantageous that the shifting unit is installed between the reduction gear-box and the power summation gearbox and the shifting unit can shift between three operating modes.

It is advantageous in this case that the reduction gearbox is a planetary gear mechanism or a step-down means, both variants having their advantages.

The power summation gearbox is advantageously a planetary gear mechanism.

It is structurally advantageous for the electric machine to engage via the reduction gearbox and the intermediate shaft into the sun gear of the power summation gearbox, the internal combustion engine engaging into the internal gear of the power summation gearbox.

It is advantageous that the power at the front axle is transmitted via a planetary carrier of the power summation gearbox.

In one embodiment, the reduction gearbox and the power summation gearbox are arranged on the same axle.

In an alternative embodiment, the power summation gearbox is arranged on the main shaft and the reduction gear box on the intermediate shaft.

In an advantageous embodiment, the electric machine is attached coaxially with respect to the main shaft and the intermediate shaft engages around the main shaft as a hollow shaft.

The shifting unit consists of a frictionally locking connection and a positively locking connection with an actuator which is arranged or engages in between.

The shifting unit in this case utilizes the frictionally locking connection in the first shifting position, which frictionally locking connection serves to transmit and limit a torque.

It is advantageous that in a second shifting position the shifting unit serves by way of a positively locking connection for the transmission of a smaller torque than in the first shifting position.

Advantageously, the shifting unit has a zero position as third shifting position.

The problem is furthermore solved by a method for operating a vehicle having a transfer gearbox, wherein a shifting logic circuit of a three-gear shifting mechanism brings about torque limiting by way of a frictionally locking connection.

Advantageously, the shifting logic circuit brings about a rotational speed safe-guard by way of the frictionally locking connection.

It is advantageous in this case that, after an existing shifting request, the shifting logic circuit examines parameters which serve both for the rotational speed safe-guard and the torque limiting.

DRAWINGS

The drawings described herein are for illustrative purposes only of selected embodiments and not all possible implementations, and are not intended to limit the scope of the present disclosure.

FIG. 13-15 show alternative embodiments

FIG. 16-18 show a further alternative embodiment in different shifting states,

FIG. 19-21 show a further alternative embodiment in different shifting states.

DESCRIPTION OF THE INVENTION

Figure 1:
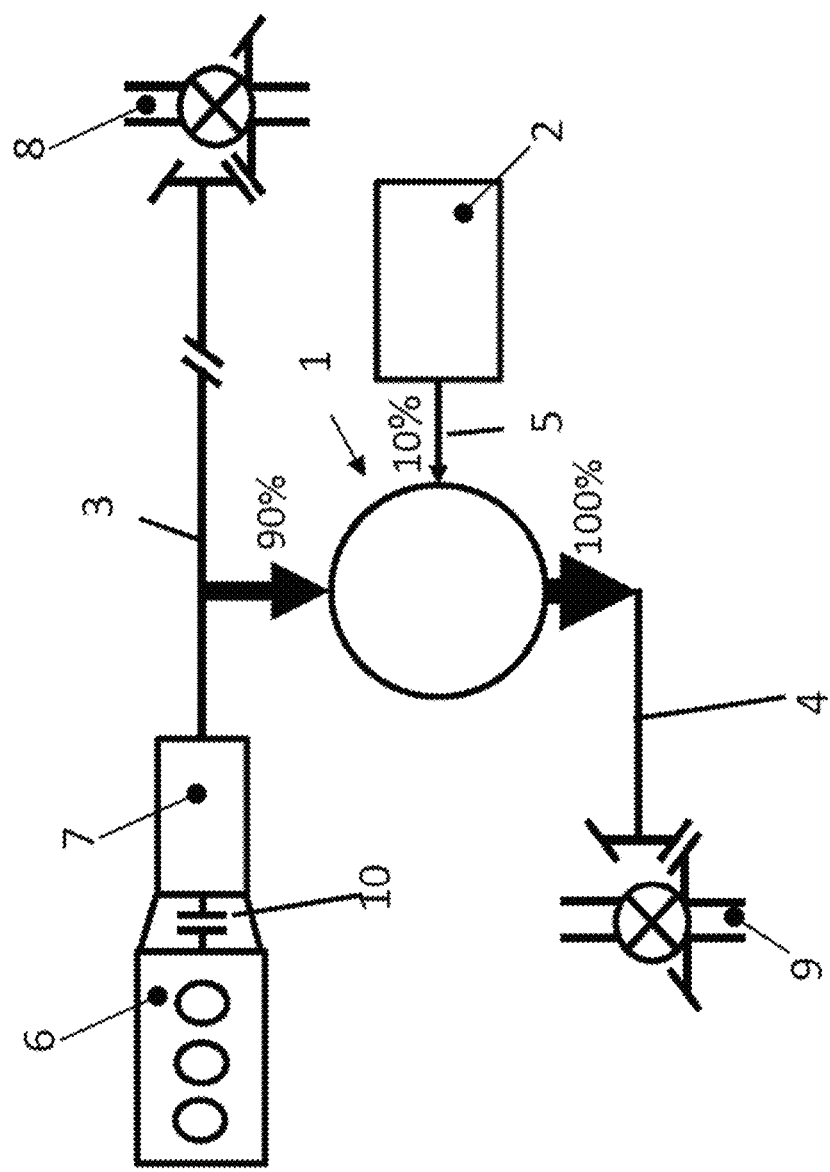
FIG. 1 shows a schematic representation of a known embodiment.

FIG. 1 shows the schematic design of a vehicle with a transfer gearbox 1 in the prior art.

An internal combustion engine 6 for the vehicle with longitudinal engine architecture and permanent rear axle drive is connected to a first shaft, the main shaft 3. The connection is made via a main clutch 10 and a main gearbox 7.

The main shaft 3 permanently drives the rear axle 8. In addition to the internal combustion engine 6, an electric machine 2 is provided which is coupled to a power summation gearbox 11 via an intermediate shaft 5. The input of the power summation gearbox 11 is connected to the main shaft 3; at the output end the power summation gearbox 11 is adjacent to a secondary shaft 4. The secondary shaft 4 is connected to the front axle 9.

A preferred embodiment is designed for vehicles which, in addition to the customary 12V on-board electrical system, also have a 48V on-board electrical system. A powerful electric machine operated at 48V can therefore be used. The distributor gearbox obtains part, e.g. 10%, of the total power from the electric ma-chine 2.

By means of the power summation gearbox 11, part of the total output of the internal combustion engine 6 is channeled off by a support moment of the electric machine 2 and boosted by the output of the electric machine 2. This allows variable torque distribution between the front axle 9 and the rear axle 8 with a high degree of precision, even in unfavorable driving conditions.

The distribution gearbox 1 is essentially made up of the power summation gear-box 11 and the reduction gearbox 12 of the electric machine 2. The electric machine 2 provides the support moment which defines the torque of the secondary shaft 4. In this case, most of the drive power, e.g. 90%, is supplied by the internal combustion engine 6 via the drive shaft, the main shaft 3, and a small part, e.g. 10%, by the electric machine 2. In addition, the electric machine 2 controls the total torque transmitted to the secondary shaft 4 by means of the torque provided. When rotational speed differences occur between the front axle 9 and the rear axle 8, the torque can, nevertheless, be variably distributed between the front and rear axle 9, 8.

Apart from the main shaft 3 which transmits torque to the rear axle 8, and the secondary shaft 4 which transmits torque to the front axle 9, a third shaft—the intermediate shaft 5—is used, on which the electric machine 2 and the planetary gear mechanism, the reduction gearbox 12, the electric machine 2 are located. In a first arrangement according to FIG. 2, the power summation gearbox 11 is like-wise located on the intermediate shaft 5. In a second arrangement according to FIG. 3, the power summation gearbox 11 is located on the main shaft 3.

Figure 2:
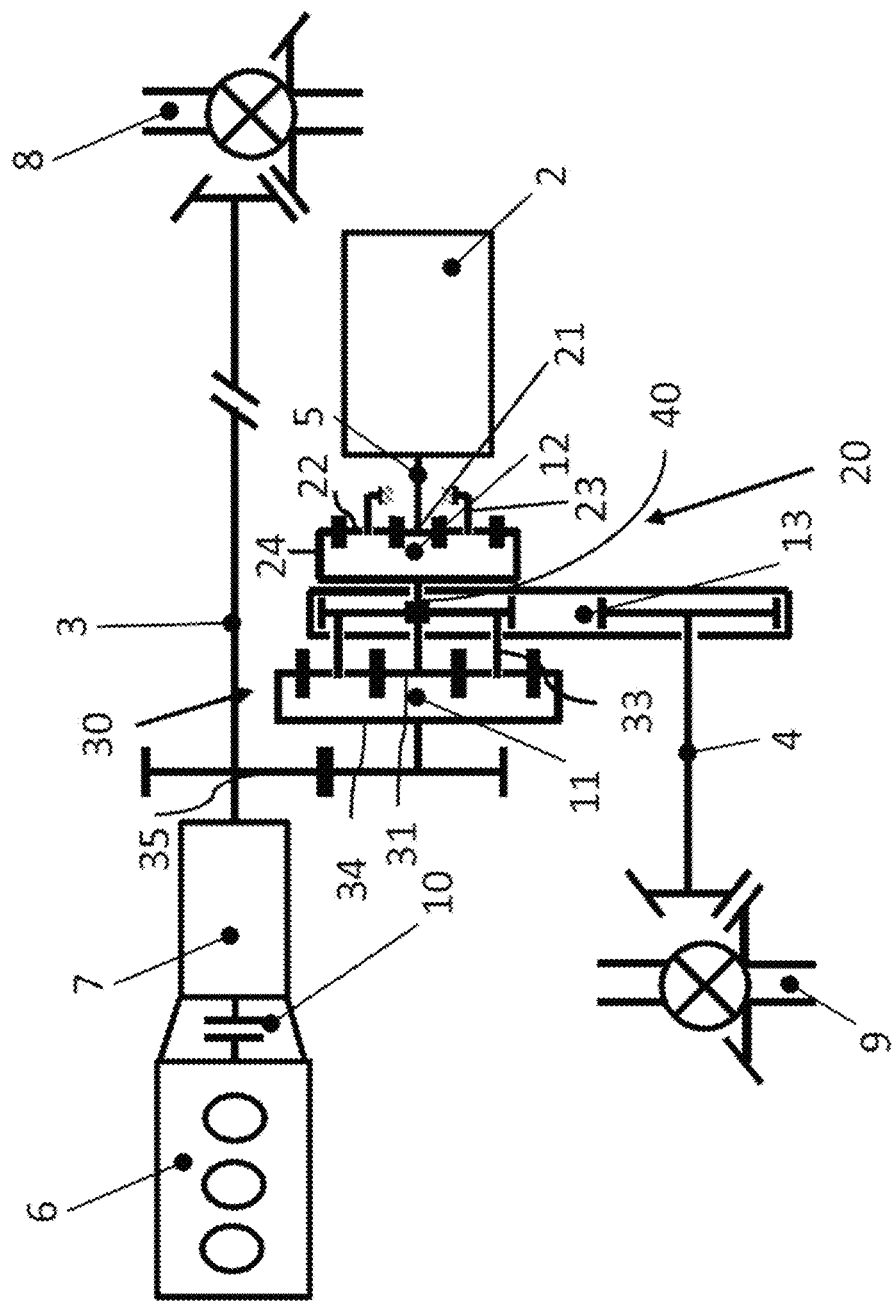
FIG. 2 shows a first exemplary embodiment with a power summation gear-box.

A first embodiment of the inventive solution is depicted in FIG. 2. The power summation gearbox 11 in this case is connected to the reduction gearbox 12.

The torque from the electric machine 2 is transmitted by the reduction gearbox 12 in such a manner that a required support moment for the power summation gear-box 11 is available.

The intermediate shaft 5 of the electric machine 2 drives a sun gear 21 of the first planetary gear mechanism 20. A planetary carrier 23 in which the planetary gears 22 rotate is fixedly connected to a housing of the distributor gearbox 1 and the torque of the electric machine 2 is tapped and transmitted via a shaft 40 at an internal gear 24 of the first planetary gear mechanism 20.

The torque supplied by the electric machine 2 is then applied via the shaft 40 to the sun gear 31 of the second planetary gear mechanism 30, in order to tap a desired torque at the front axle 9, e.g.: 1300 Nm.

In the power summation gearbox 11, the second planetary gear mechanism 30, the electric machine 2 contributes via its torque a part, e.g. 10%, which corre-sponds to roughly 130 Nm in the example, and the remainder e.g.: 90% corresponding to 1170 Nm is tapped from the main shaft 3.

The torque of the electric machine 2 which is reduced by the reduction gearbox 12 drives the sun gear 31 of the second planetary gear mechanism 30 in the power summation gearbox 11.

An internal gear 34 of the second planetary gear mechanism 30 is connected in a driving manner via a driving wheel set 35 to the main shaft 3.

The summed torque of the sun gear 31 and internal gear 34 at a planetary carrier 33 of the second planetary gear mechanism 30 is transmitted via a chain drive 13 to the secondary shaft 4.

The torque distribution, in other words the contribution made by the two drive elements, the internal combustion engine 6 and the electric machine 2, defines the transmission of the power summation gearbox 11. The correlation between the torque of the front axle 9 and the torque of the electric machine 2 gives rise to the possibility of selecting pure two-wheel drive when the torque of the electric machine 2 is turned back to zero.

The electric machine 2 may also be operated in generator mode and convert corresponding mechanical energy into electrical energy and store this in a battery. In recuperation mode, the electric machine 2 is driven by the entrained front axle 9.

In an alternative embodiment, the driving wheel set 35 is not realized by a pair of gearwheels, but by a chain drive 13.

Figure 3:
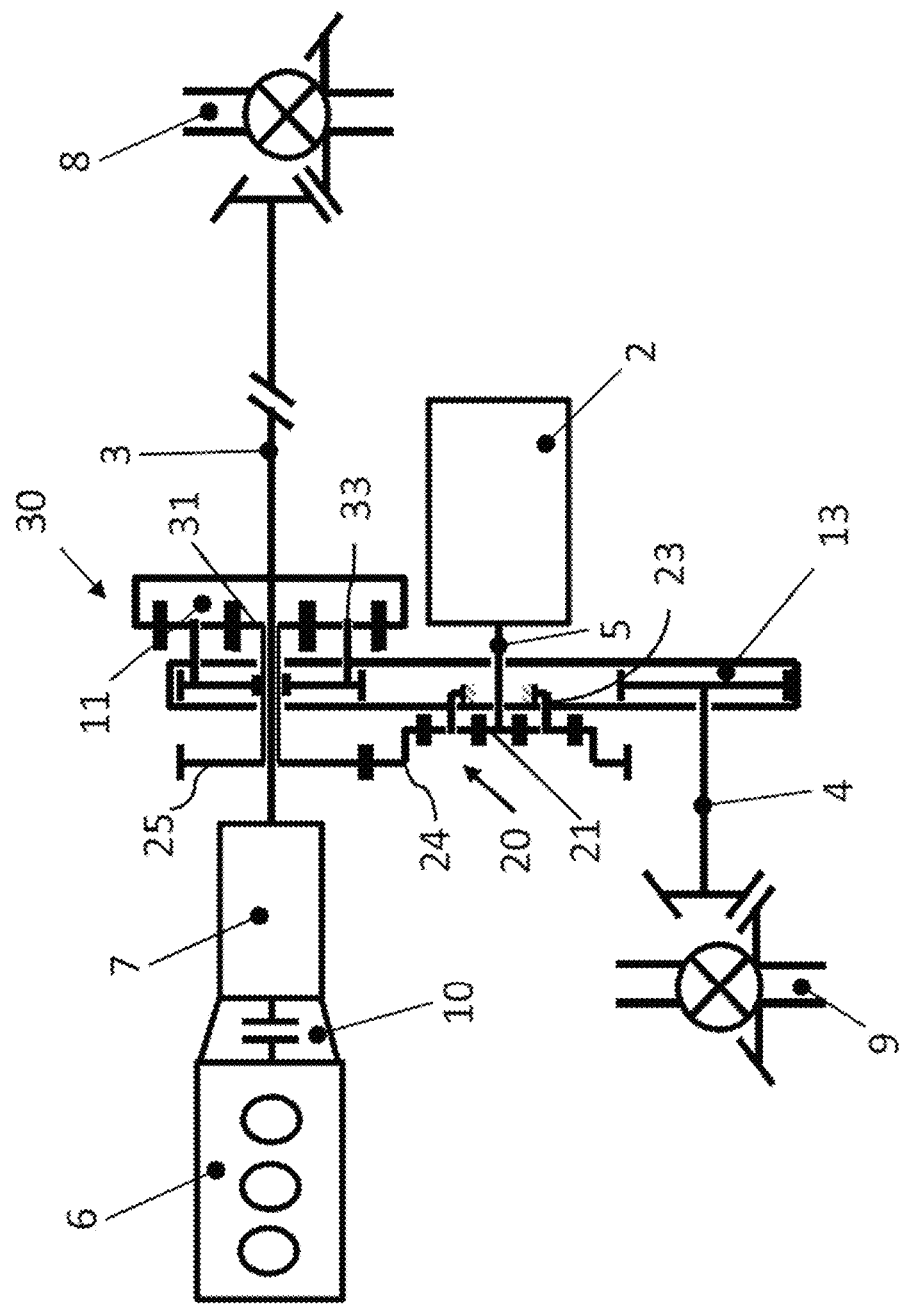
FIG. 3 shows a second exemplary embodiment with a power summation gearbox.

The second embodiment according to FIG. 3 differs from the first embodiment in that the reduction gearbox 12 is not connected to the sun gear 31 of the power summation gearbox 11 via the internal gear of the first planetary gear mechanism 20, but via a drive wheel 25. The second planetary gear mechanism 30 in this case is arranged along the main shaft 3, wherein the drive set engages via a hollow shaft with the sun gear 31 of the second planetary gear mechanism 30. As in the first embodiment, the summed torque is transmitted to the chain drive 13 via the planetary carrier 33 of the second planetary gear mechanism 30. The axles of the two planetary gear mechanisms 20, 30 are arranged so as to be offset parallel to one another.

In all embodiments, the chain drive 13 for driving the secondary shaft 4 may be replaced by a pair of gearwheels.

In applications of electric machines 2 in the drivetrain for the active four-wheel setting, for example, the high-transmission mass inertia moment of the electric machine 2 may lead to unwanted coupling moments between the front and rear axles 9, 8 or disturbance torques at one of the front and rear axles 9, 8. A slippage between the front and rear axles 9, 8 may, moreover, lead to rotational speeds at the electric machine 2 which damage the electric machine 2. Apart from these safety-critical requirements, it should likewise be possible for transmission between the electric machine 2 and an axle, either the front or rear axle 9, 8, to be switched, so that effective electric driving or recuperation is possible.

Figure 4:
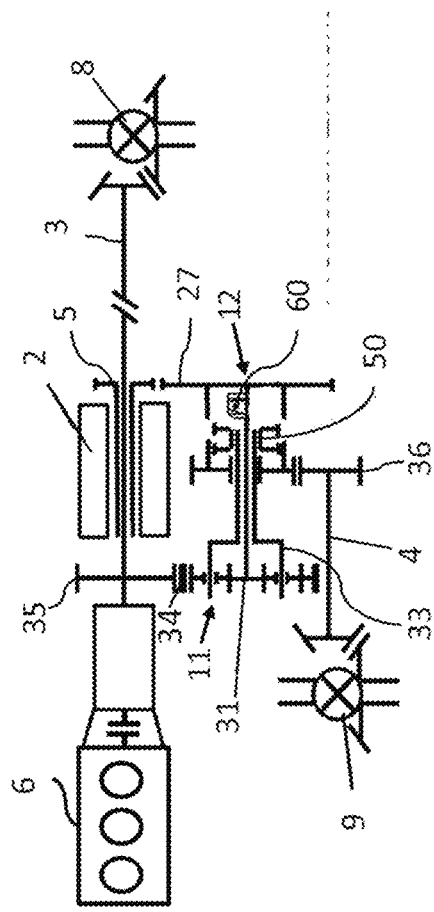
FIG. 4-6 shows a third exemplary embodiment.
Figure 5:
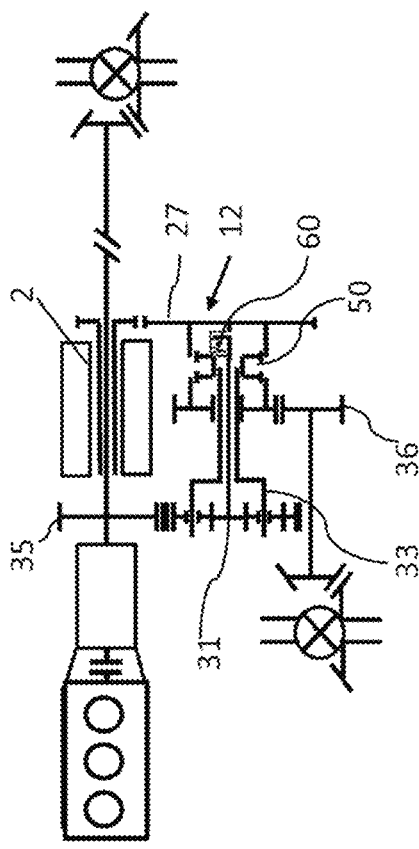
Figure 6:
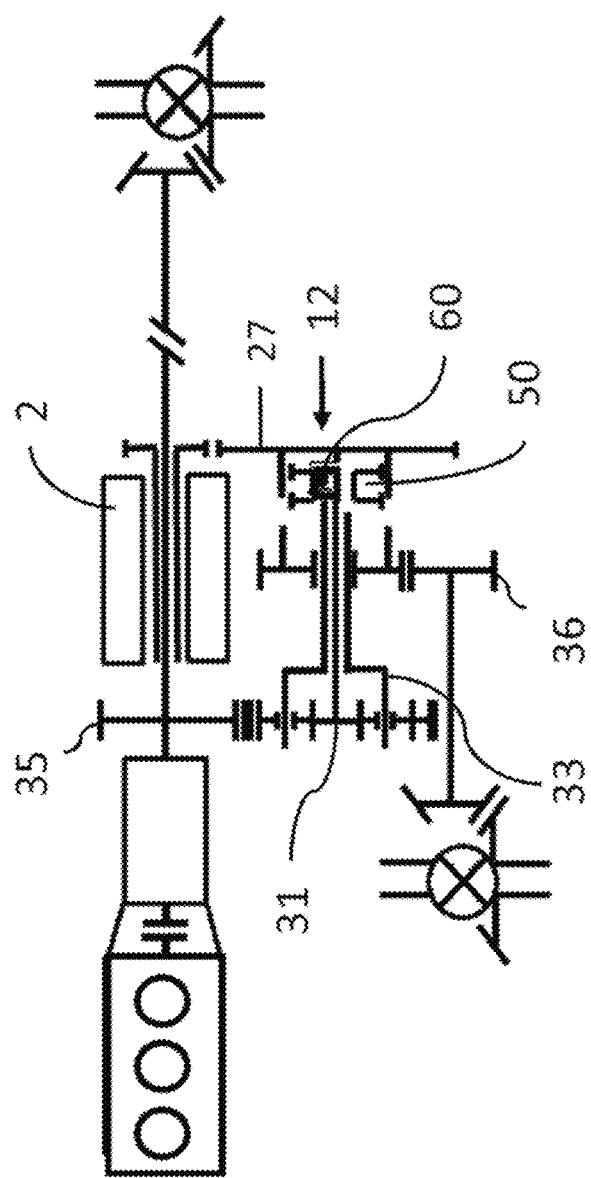

In a further embodiment, as is shown in FIG. 4 to FIG. 6, the system may have a shifting unit 50 added to it, in order to increase the recuperation efficiency and completely disconnect the electric machine 2 from the drivetrain and/or to allow electric driving.

In this third embodiment, the electric machine 2 is arranged concentrically about the main shaft 3. The third shaft, the intermediate shaft 5, is configured as a hollow shaft in this case and transmits the torque via a front drive set 36 to a reduction gearbox 12. The reduction gearbox 12 in this embodiment is designed as a pure reduction gear in this case.

A reduction gearwheel 27 is connected to the sun gear 31 of the power summation gearbox 11 with a fixed drive. As in the preceding embodiments, a drive wheel set 35 drives the internal gear 34 of the power summation gearbox 11.

The planetary gear carrier 33 is in turn connected in terms of drive to a front drive set 36 which drives the secondary shaft 4. Between the front drive set 36 and the reduction gearwheel 27, a shifting unit is indicated as a U-shaped connection. In the shifting state in FIG. 4, the shifting unit 50 is not activated, the four-wheel mode is guaranteed as in the embodiments already discussed.

In FIG. 5 the shifting unit 50 is displaced and connects the front drive set 36 to the reduction gearwheel 27. In this position, the electric machine 2 is directly connected to the main shaft 3 and also the secondary shaft 4. This means that the conversion of mechanical energy into electrical energy over a defined speed range is very efficiently possible. In FIG. 6, the shifting unit 50 is completely displaced to the right and the electric machine 2 is uncoupled from the remaining drivetrain. In FIGS. 4-6, moreover, a protective element 60 is indicated which is installed as a separate element or in an integrated manner in the shifting unit 50. The protective element 60 is designed in such a manner that it actively or passively protects the electric machine 2 from an excessively high rotational speed or an excessively high torque. It may be integrated in the shifting unit 50.

Figure 7:
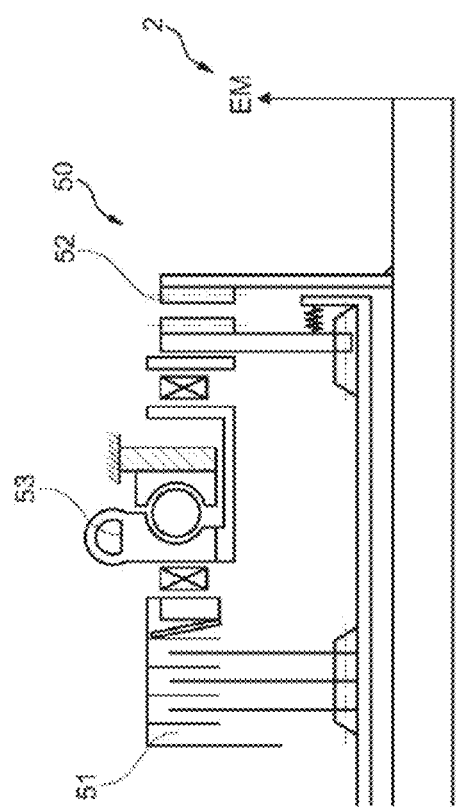
FIG. 7 shows a shifting element.

FIG. 7 shows by way of example a design of a shifting unit 50 combined from a frictionally locking connection 51 and a positively locking connection 52.

Figure 8:
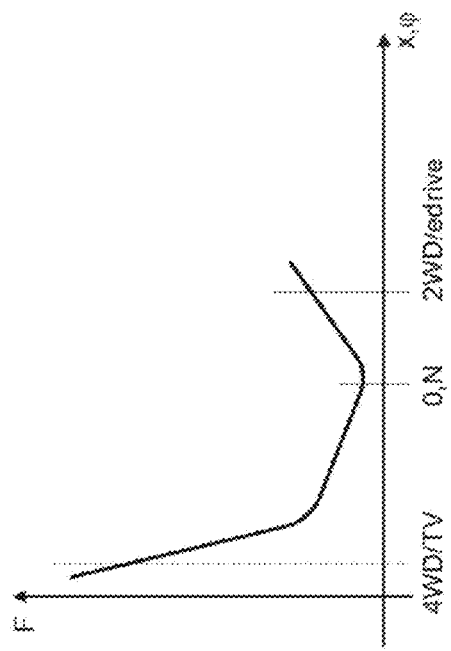
FIG. 8 shows a force-travel characteristic curve of the shifting unit.

When the frictionally locking connection 51 is in the first shifting position, four-wheel drive should be represented depending on the selected torque of the electric machine 2. In this case, an actuator 53 moves the shifting unit 50 into a position in which the frictionally locking connection 51 is closed. The position is marked in FIG. 8 as 4WD/TV. The transmitted torque is limited by the maximally transmittable moment of the frictionally locking connection 51 and thereby protects the electric machine 2 from overload.

By actively reversing the actuator 53, unwanted disturbance torques, e.g. coupling moments based on the mass inertia of the electric machine 2, can also be neutralized. A differential speed may likewise be received through slippage of the frictionally locking connection 51.

When the positively locking connection 52 is in a second shifting position, the electric machine 2 should convert mechanical energy into electrical energy and vice versa. Since a differential speed customarily prevails prior to shifting, the electric machine 2 can be used to adjust the rotational speeds and by way of an active load change of the electric machine 2, the positively locking connection 52 can be disconnected at any time. The actuator 53 need therefore only apply a small amount of force for this shifting position which is characterized in FIG. 8 as 2WD/e-drive.

A third shifting position, a zero position N, is used for the general protection of the electric machine 2. In this shifting position, the shifting unit 50 has a small drag torque.

This 3-gear shifting unit is configured as a combination of frictionally locking and positively locking connections for realizing different electrical machine functions and protective functions.

Figure 9:
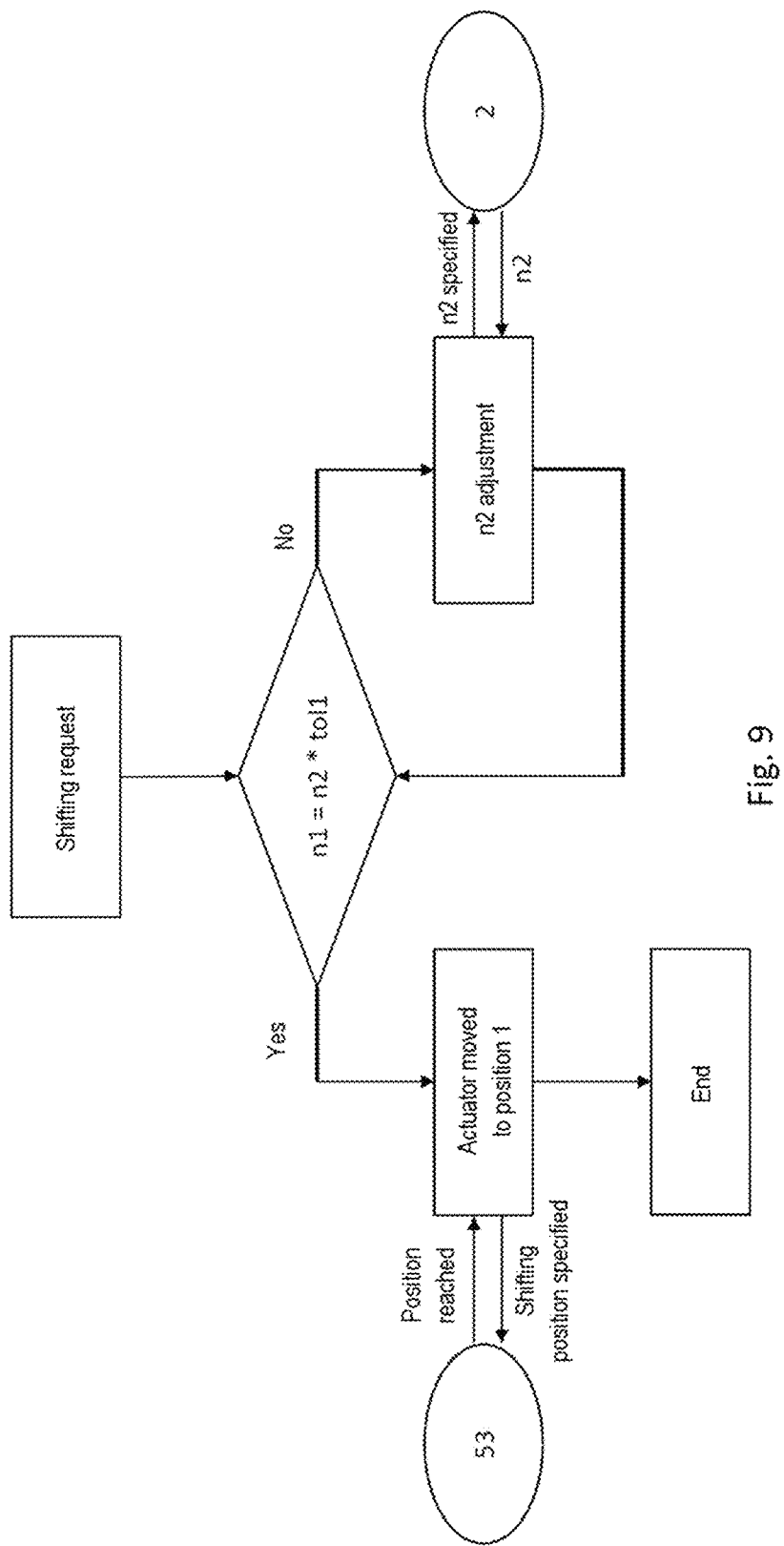
FIG. 9-12 show shifting sequences

In FIG. 9 the shifting logic circuit is represented for a change of N following the shifting position 1. Starting with the shifting request, a first check is made as to whether the rotational speed $n_1$, which depends on the vehicle speed, within a tolerance range $tol_1$ is identical to the rotational speed $n_2$ of the electric machine 2. The tolerance range $tol_1$ is defined by the tolerance for the frictionally locking connection during a convenient shifting process. If the two rotational speeds are identical, the actuator 53 can move into the shifting position 1. If the rotational speeds are different, however, an adjustment of the rotational speed of the electric motor is carried out.

Figure 10:
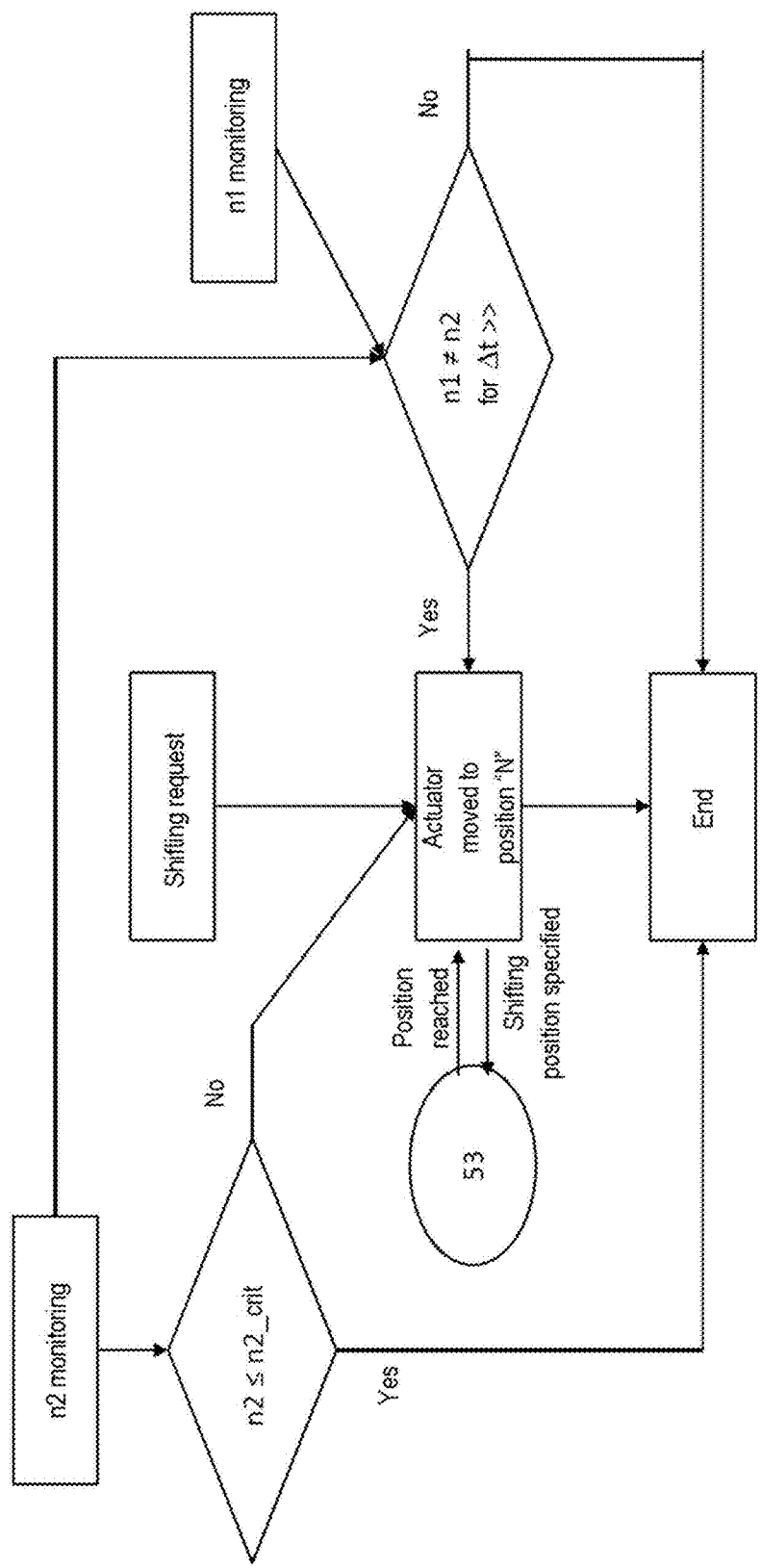

FIG. 10 shows the shifting logic circuit for a shift from the shifting position 1 into the neutral position N. The process begins once again with the shifting request. In this case, however, two parameters are requested. The first involves monitoring the rotational speed n2 of the electric machine 2. If this speed lies below the critical rotational speed of the electric machine 2, the shifting request is satisfied. If, however, the rotational speed should approach the critical point, the process of adjusting the actuator 53 is interrupted. As a further monitoring parameter, the vehicle speed and the rotational speed n1 thereby produced is monitored. If the two rotational speeds are not identical for a given time, the shifting process is carried out. If the two rotational speeds are identical for a given interval of time, the shifting process is likewise interrupted.

Figure 11:
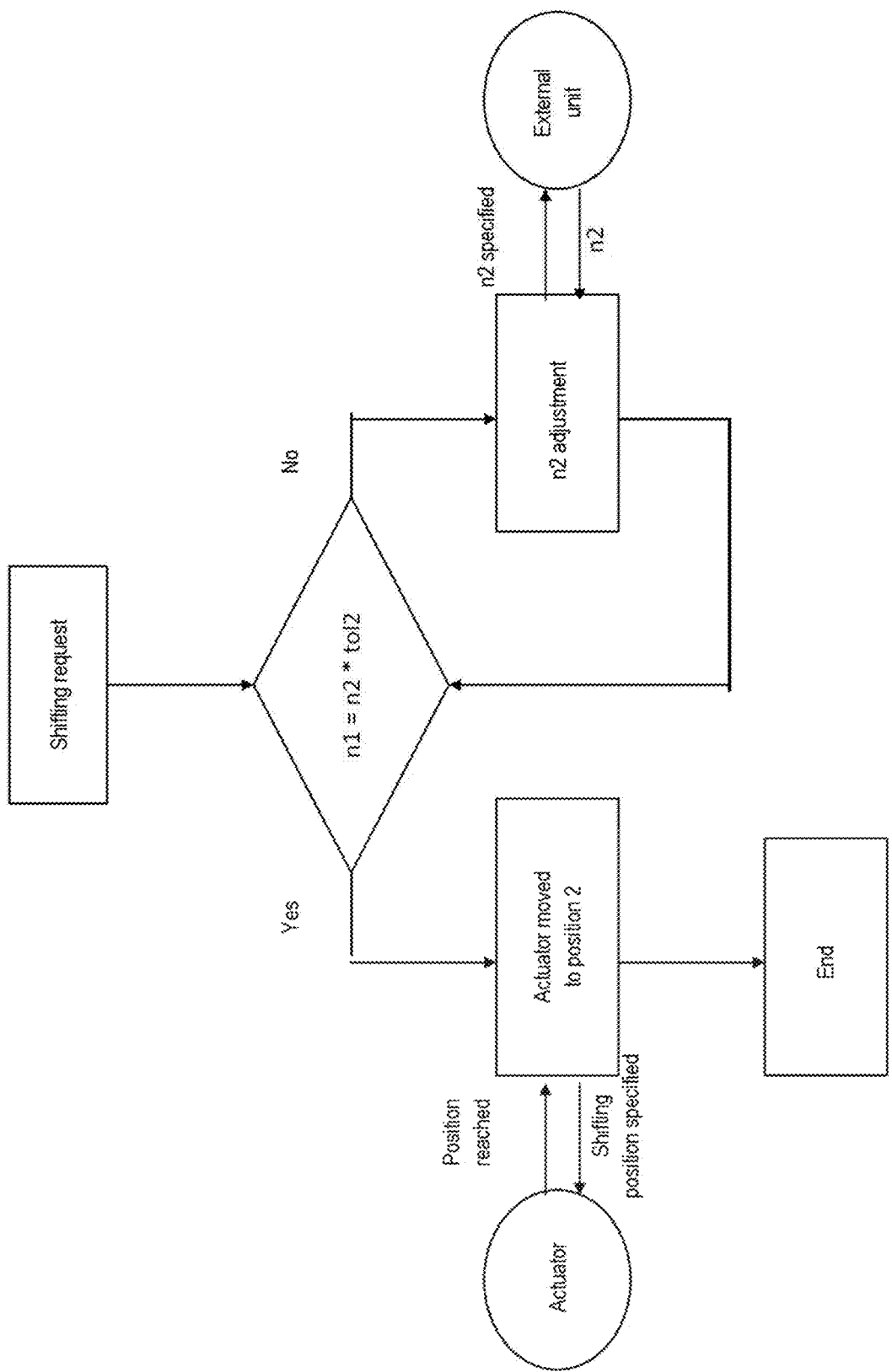

In FIG. 11 the shifting logic circuit for shifting from the neutral position N into the shifting position S2 is depicted. The process in this case runs just as already described in FIG. 9, except that the current actuator is moved into the shifting positions S2 for this shifting request.

Figure 12:
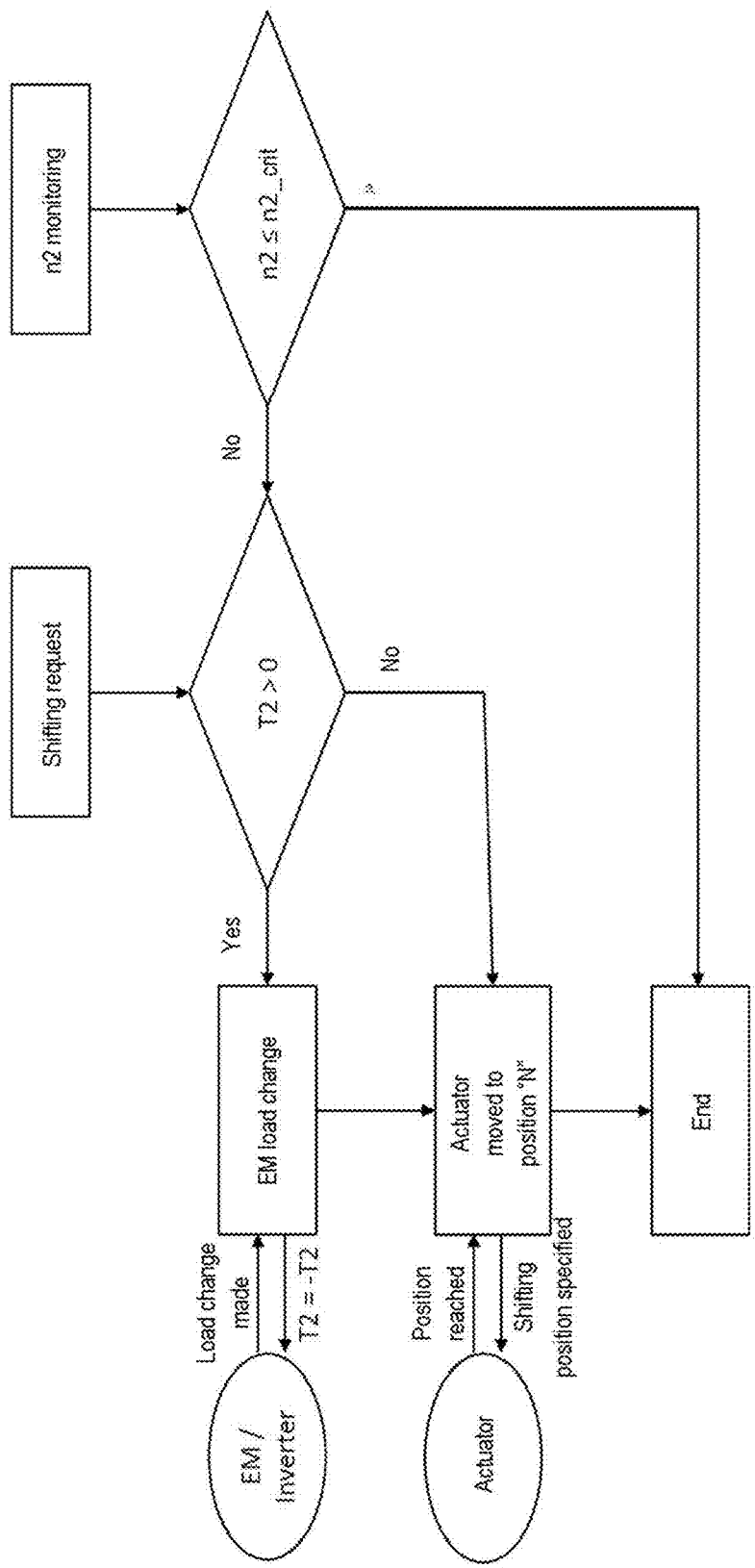

FIG. 12 describes the shifting logic circuit for a shift from the shifting position S2 into the neutral position N. Starting with the shifting request, the torque T2 of the electric machine 2 is requested. If the torque is T2>0, the electric machine 2 is initiated to make a load change. If the torque is smaller than 0, the actuator 53 may be moved into the zero position. At the same time, the logic circuit is used for the load change and for the movement of the current actuator 53, in order to protect the electric machine 2 from critical rotational speeds. When monitoring the rotational speed n2, an adjustment takes place to see whether the speed lies below the critical range. If this is not the case, the logical steps arranged to the left below the shifting request are reused.

Alternative embodiments are depicted in FIG. 13 to FIG. 15.

If the rotor of the electric machine 2 is configured as a hollow shaft, the electric machine 2 may also be positioned coaxially to the main shaft 3. In this case, the reduction gearbox 12 and the power summation gearbox 11 are arranged on the intermediate shaft 5, as shown in FIG. 13.

The positions of the electric machine 2, the reduction gearbox 12, and the power summation gearbox 11 can be interchanged arbitrarily between the main shaft 3, the secondary shaft 4, and the intermediate shaft 5. For example, the electric machine 2 in FIG. 14 is arranged on the secondary shaft 4, the reduction gear-box 12 on the intermediate shaft 5, and the power summation gearbox 11 on the main shaft 3.

The intermediate shaft 5 can be dispensed with by arranging the electric machine 2 with the two gearboxes, the power summation gearbox 11, and the reduction gearbox 12 on the primary axle, the main shaft 3 or the secondary shaft 4. In this case, the electric machine 2 or the two gearboxes, the power summation gearbox 11 and the reduction gearbox 12, may lie on a shaft, as depicted in FIG. 15, or be divided up arbitrarily between the two remaining shafts.

FIG. 16 to FIG. 18 show a further alternative embodiment in which a multi-plate clutch, in other words a frictionally locking connection 51, is installed.

Apart from the main shaft 3 which transmits torque to the rear axle 8, and the secondary shaft 4 which transmits torque to the front axle 9, a third shaft, the intermediate shaft 5, is used, on which the shifting unit 50 is located. The electric machine 2 and the reduction gearbox 12 are mounted coaxially on the main shaft 3, which means that the rotor diameter of the electric machine 2 and the reduction gearbox internal diameter must be greater than the main axle shaft diameter. The torque is supplied to the intermediate shaft 5 from the electric machine 2 by way of a differential gearbox 14. In this arrangement, the power summation gearbox 11 is likewise located on the intermediate shaft 5.

The torque of the electric machine 2 is transmitted by the reduction gearbox 12 and the differential gearbox 14 in such a manner that a required supporting moment is adjacent to the sun gear 31 of the power summation gearbox 11, in order to divert a desired torque to the front axle 9. The electric machine 2 normally en-gages into the sun gear 21 of the planetary gear mechanism from the reduction gearbox 12; the internal gear 24 is fixedly connected to the housing and the torque is tapped at the planetary carrier 23 and transmitted through the differential gearbox 14.

In the power summation gearbox 11, the electric machine 2 contributes part and the remainder is diverted from the main shaft 3. The torque of the electric machine 2, which is transmitted by the planetary gear mechanism, the reduction gearbox 12, and the differential gearbox 14, engages into the sun gear 31 in the power summation gearbox 11. The internal gear 34 of the power summation gearbox 11 is connected to the main shaft 3 in a driving manner. The summed torque of the sun gear 31 and the internal gear 34 is transmitted at the planetary gear mechanism 33 via a gearwheel stage to the secondary shaft 4.

The shifting unit 50 allows shifting between two operating modes. In four-wheel drive, a frictionally locking connection 51 is closed, wherein the sun gear 31 of the power summation gearbox 11 and the electric machine 2 are connected. In this case, the electric machine 2 delivers additional torque in four-wheel drive, wherein improved driving dynamics can be produced. In recuperation mode, a positively locking connection, an actuator 53, is closed, wherein the internal gear of the power summation gearbox 11 and the electric machine 2 are connected. In this case, braking energy can be recovered from the rear axle 8 and converted into electrical energy and stored in a battery. With a small amount of expenditure, it is possible for the brake energy to be recovered from the front axle 9, as the planetary carrier 33 of the power summation gearbox 11 is then connected to the electric machine 2. When both frictionally locking and positively locking connections are uncoupled, the electric machine 2 is uncoupled from the power summation gearbox 11, in order to minimize losses by the power summation gearbox 11 and to guarantee pure rear-wheel drive.

FIG. 16 shows the force profile in four-wheel drive operation. In four-wheel drive, a rigid connection between the rear axle 8 and the front axle 9 and the electric machine 2 and torque support is guaranteed by the power summation gearbox 11. In this operating mode, the shifting unit 50 is closed by means of the frictionally locking coupling, which is why the torque of the electric machine 2 is transmitted to the sun gear 31 of the intermediate shaft 5 by means of the reduction stage. The torque of the main gearbox 7 in this case is partially divided between the rear axle 8 and the front axle 9. Part of the moment which is transmitted to the power summation gearbox 11 is summed with the torque of the electric machine 2 and conducted to the front axle 9. Through the moment support of the electric machine 2, the torque vectoring function takes place in the longitudinal direction of the vehicle, where necessary.

In the neutral operating mode according to FIG. 17, the electric machine 2 is uncoupled from the power summation gearbox 11 by activating the shifting unit 50. In this operating mode, the torque of the main gearbox 7 flows to the rear axle 8 without torque support by the electric machine 2. The sun gear 31 of the inter-mediate shaft 5 is uncoupled from the E-machine 2, which means that there is no torque flow to the front axle 9. Since the electric machine 2 is uncoupled, the losses in the electric machine 2 and the reduction stage between the electric machine 2 and the sun gear of the intermediate shaft 5 can be disregarded.

In the 2WD/recuperation operating mode according to FIG. 18, both pure rear axle drive and recuperation of the brake energy from the rear axle 8 are possible. By means of the shifting unit 50, the internal gear 34 of the power summation gearbox 11 and the shifting collar of the shifting unit 50 are closed in a positively locking manner, as a result of which the torque is fed from the internal gear 34 of the power summation gearbox 11 through the reduction stage to the electric machine 2. Consequently, the brake energy is recovered from the rear axle 8 by the electric machine 2. If there is a reverse torque flow from the electric machine 2 to the rear axle 8, the pure rear axle drive with torque support of the electric machine 2 is realized. Since the sun gear 31 is unloaded, no force is transmitted to the front axle 9.

For the embodiment as claimed in FIG. 19 to FIG. 21, vehicles with longitudinal engine architecture and permanent rear axle drive which, apart from the customary 12V on-board electrical system, also have a 48V on-board electrical system are an application. In this case, the electric machine 2 operated at 48V should be able to supply part, e.g. 10%, of the total output at the front axle 9. By means of the power summation gearbox 11, part of the total output of the internal combustion engine is channeled off by supporting the electric machine 2 and boosted with the output of the electric machine 2. This allows a fully variable torque distribution between the front axle 9 and the rear axle 8 with a high degree of accuracy.

Apart from the main shaft 3 which transmits torque to the rear axle 8 and the secondary shaft 4 which transmits torque to the front axle 9, the intermediate shaft 5 is used on which the electric machine and the reduction gearbox 12 of the electric machine 2 are located. In this arrangement, the power summation gearbox 11 is likewise located on the intermediate shaft 5.

The torque of the electric machine 2 is transmitted by the reduction gearbox 12 in such a manner that a required support moment is applied to the sun gear 21 of the power summation gearbox 11, in order to divert a desired torque at the front axle 9, e.g. 1300 Nm. The electric machine 2 usually engages into the first stage of a spur gear set which then drives the second stage.

In the power summation gearbox 11 the electric machine 2 contributes a part, e.g. 10%=130 Nm, after the reduction gearbox 12 and the remainder, e.g. 90%=1170 Nm is diverted from the main shaft 3. The torque of the electric machine 2 which is transmitted by the reduction gearbox 12 engages into the sun gear 21 in the power summation gearbox 11. The internal gear 24 of the power summation gearbox 11 is connected to the main shaft 3 in a driving manner. The summed torque of the sun gear 21 and internal gear 24 is transmitted to the secondary shaft 4.

The relationship of the torque distribution e.g. 10%: 90% defines the transmis-sion ratio of the power summation gearbox 11. The correlation between the torque of the front axle 9 and the torque of the electric machine 2 gives rise to the possibility of selecting pure two-wheel drive when the torque of the electric machine 2 is equal to 0 Nm.

Conversely, the electric machine 2 may also be operated in generator mode and convert corresponding mechanical energy into electrical energy and store this in a battery (recuperation).

The system has a shifting unit 50 which is arranged on the intermediate shaft 5. The shifting unit 50 is activated via an actuator 53 and has 3 shifting positions, wherein these are produced by positively locking connections 52 such as claw couplings.

FIG. 19 the positively locking connection 53 is indented on the right, which allows four-wheel drive, in other words 4WD/TV mode.

FIG. 20 shows the shifting position in which the claw is indented on the left and therefore allows two-wheel drive with recuperation and an electric drive mode.

FIG. 21 shows the claw in the central position which depicts a neutral state.

LIST OF REFERENCE DESIGNATIONS

1 Transfer gearbox
2 Electric machine
3 Main shaft
4 Secondary shaft
5 Intermediate shaft
6 Internal combustion engine
7 Main gearbox
8 Rear axle
9 Front axle
10 Main clutch
11 Power summation gearbox
12 Reduction gearbox
13 Chain drive
14 Differential gearbox
20 First planetary gear mechanism
21 Sun gear of the first planetary gear mechanism
22 Planetary gears of the first planetary gear mechanism
23 Planetary carrier of the first planetary gear mechanism
24 Internal gear of the first planetary gear mechanism
25 Drive gear
26 Input drive set
27 Reduction gearwheel
30 Second planetary gear mechanism
31 Sun gear of the second planetary gear mechanism
32 Planetary gears of the second planetary gear mechanism
33 Planetary carrier of the second planetary gear mechanism
34 Internal gear of the second planetary gear mechanism
35 Drive wheel set
36 Front drive set
40 Shaft
50 Shifting unit
51 Frictionally locking connection
52 Positively locking connection
53 Actuator
60 Protective element

What is claimed is:

1. A vehicle having a longitudinally arranged engine combustion and permanent rear axle drive, which vehicle has an internal combustion engine and an electric machine, a transfer gearbox distributing drive torques as required to two drive axles, the front and rear axles, the transfer gearbox being connected to three shafts, a main shaft serving as a drive shaft of the rear axle, a secondary shaft serving as a drive shaft for the front axle, and an intermediate shaft applying a torque from the electric machine to the transfer gearbox, the transfer gearbox having a reduction gearbox and a power summation gearbox, and the summed output power of the power summation gearbox prevailing at the secondary shaft by way of a chain of a chain drive or a gearwheel set, wherein a shifting unit is installed between the reduction gearbox and the power summation gearbox, and wherein the shifting unit shifts between three operating modes.

2. The vehicle as claimed in claim 1, wherein the reduction gearbox is a planetary gear mechanism or a step-down means.

3. The vehicle as claimed in claim 1, wherein the power summation gearbox is a planetary gear mechanism.

4. The vehicle as claimed in claim 3, characterized in that the electric machine engages via the reduction gearbox and the intermediate shaft into the sun gear of the power summation gearbox, the internal combustion engine engaging into the internal gear of the power summation gearbox.

5. The vehicle as claimed in claim 3, wherein the power is transmitted at the front axle via a planetary carrier of the power summation gearbox.

6. The vehicle as claimed in claim 1, wherein the reduction gearbox and the power summation gearbox are arranged on the same axle.

7. The vehicle as claimed in claim 1, wherein the power summation gearbox is arranged on the main shaft, and the reduction gearbox is arranged on the intermediate shaft.

8. The vehicle as claimed in claim 1, wherein the electric machine is attached coaxially with respect to the main shaft, and the intermediate shaft engages around the main shaft as a hollow shaft.

9. The vehicle as claimed in claim 1, wherein the shifting unit consists of a frictionally locking connection and a positively locking connection with an actuator which is arranged or engages in between.

10. The vehicle as claimed in claim 9, wherein the shifting unit utilizes the frictionally locking connection in the first shifting position, which frictionally locking connection serves to transmit and limit a torque.

11. The vehicle as claimed in claim 9, wherein in a second shifting position, the shifting unit serves by way of the positively locking connection for the transmission of a smaller torque than in the first shifting position and is disconnected by way of an active load change of the electric machine.

12. The vehicle as claimed in claim 1, wherein the shifting unit has a zero position as third shifting position.

13. A method for operating a vehicle having a transfer gearbox as claimed in claim 1, wherein a shifting logic circuit of a three-gear shifting mechanism bringing about torque limiting by way of a frictionally locking connection.

14. The method for operating a vehicle as claimed in claim 13, wherein the shifting logic circuit brings about a rotational speed safeguard for the electric machine by way of the frictionally locking connection.

15. The method for operating a vehicle as claimed in claim 13, wherein after an existing shifting request, the shifting logic circuit examines parameters which serve both for the rotational speed safeguard and the torque limiting.

16. The method for operating a vehicle as claimed in claim 13, wherein in a second shifting position, the shifting unit serves by way of the positively locking connection for the transmission of a smaller torque than in the first shifting position, and is disconnected by way of an active load change of the electric machine.

17. A vehicle having a longitudinally arranged engine combustion and permanent rear axle, which vehicle has an internal combustion engine and an electric machine, a transfer gearbox distributing drive torque as required between two drive axles, the front and rear axles, the transfer gearbox being connected to three shafts, a main shaft serving as a drive shaft of the rear axle, a secondary shaft serving as a drive shaft for the front axle, and an intermediate shaft applying a torque from the electric motor to the transfer gearbox, the transfer gearbox having a reduction gearbox and a power summation gearbox, and the summed output power of the power summation gearbox prevailing at the secondary shaft by way of a chain drive or a gearwheel set, wherein a shifting unit is installed between the reduction gearbox and the power summation gearbox, and wherein the shifting unit includes a frictionally locking connection and a positively locking connection with an actuator which is arranged or engages in between.

* * * * *